(12) United States Patent
Uchiumi (10) Patent No.: US 11,334,304 B2
(45) Date of Patent: May 17, 2022

(54) INFORMATION PROCESSING APPARATUS TO DISPLAY PRINT ATTRIBUTE OF MULTIPLE GROUPS ON IDENTICAL DISPLAY AND NON-TRANSITORY COMPUTER READABLE MEDIUM

(71) Applicant: FUJIFILM Business Innovation Corp., Tokyo (JP)

(72) Inventor: Yohei Uchiumi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 16/989,860

(22) Filed: Aug. 10, 2020

(65) Prior Publication Data

US 2021/0286574 A1 Sep. 16, 2021

(30) Foreign Application Priority Data

Mar. 16, 2020 (JP) .............................. JP2020-044945

(51) Int. Cl.
*G06F 7/04* (2006.01)
*G06F 3/12* (2006.01)
(52) U.S. Cl.
CPC .......... *G06F 3/1267* (2013.01); *G06F 3/1204* (2013.01); *G06F 3/1256* (2013.01); *G06F 3/1263* (2013.01); *G06F 3/1274* (2013.01)

(58) Field of Classification Search
CPC .... G06F 3/1262; G06F 3/1253; G06F 3/1263; G06F 3/1275
USPC .................................. 358/1.15, 1.9; 707/737
See application file for complete search history.

(56) References Cited

U.S. PATENT DOCUMENTS

| | | | | |
|---|---|---|---|---|
| 5,818,444 | A | * 10/1998 | Alimpich | ................ G06F 9/451 715/765 |
| 7,475,362 | B2 | 1/2009 | Fujiyoshi | |
| 2003/0156479 | A1* | 8/2003 | Fujiyoshi | ............ G06F 3/04817 365/200 |
| 2010/0188700 | A1* | 7/2010 | Fujimori | ............... G06F 3/1205 358/1.15 |

FOREIGN PATENT DOCUMENTS

| | | |
|---|---|---|
| JP | 3752867 | 3/2006 |
| JP | 2007328516 | 12/2007 |
| JP | 4095458 | 6/2008 |

* cited by examiner

*Primary Examiner* — Jamares Q Washington
(74) *Attorney, Agent, or Firm* — JCIPRNET (57) ABSTRACT

An information processing apparatus includes a processor configured to, in a case where a print attribute is set for each of multiple groups each having a single page or multiple pages, display the groups and the print attribute on an identical display.

16 Claims, 12 Drawing Sheets

Setting in an incompatible state between print settings:

⦿ Make a print setting, which causes an incompatible state, unselectable

○ Use the print setting of the move destination preferentially when an incompatible state occurs ○ Use the print setting of the move target preferentially when an incompatible state occurs ○ Ask a user ☑ Preferentially use an automatically-preferable setting automatically

- SINGLE-SIDED PRINTING (NOT DOUBLE-SIDED PRINTING) < DOUBLE-SIDED PRINTING (LONG SIDE), DOUBLE-SIDED PRINTING (SHORT SIDE) (*1)
- NO Nup < 2up < 4up < 6up < 8up < ... (*1)
- LAST PAGE WHICH IS REMAINDER DUE TO ODD NUMBER OF PAGES INCLUDED IN CHAPTER TO WHICH DOUBLE-SIDED PRINTING IS SET < ANOTHER INCOMPATIBLE SETTING (*2)
- REMAINING PAGES WHICH ARE REMAINDER OF PAGES OF CHAPTER TO WHICH Nup IS SET < ANOTHER INCOMPATIBLE SETTING (*2)
- SINGLE PAGE IN CHAPTER TO WHICH STAPLING IS SET < ANOTHER INCOMPATIBLE SETTING (*3)

(*1) ASSUME THAT SETTING OF NO DOUBLE-SIDED PRINTING IS DEFAULT SETTING. THE SAME IS TRUE FOR "NO Nup".
(*2) ALTHOUGH DOUBLE-SIDED PRINTING IS SET, IF PAGE COUNT IS ODD NUMBER, LAST PAGE MAY BE REGARDED AS NOT BEING SUBJECTED TO DOUBLE-SIDED PRINTING. THUS, SETTING OF DOUBLE-SIDED PRINTING IS NOTHING FOR THE PAGE, AND ANOTHER INCOMPATIBLE SETTING IS USED PREFERENTIALLY. ALTHOUGH Nup IS SET, IF THERE ARE REMAINING PAGES WHICH ARE REMAINDER, ANOTHER INCOMPATIBLE SETTING IS USED PREFERENTIALLY FOR SIMILAR REASON.
(*3) ALTHOUGH STAPLING IS SET, IF STAPLING RANGE IS ONLY ONE PAGE, USER IS HIGHLY LIKELY TO PERFORM ERRONEOUS OPERATION. THUS, ANOTHER INCOMPATIBLE SETTING IS USED PREFERENTIALLY FOR STAPLING SETTING.

INFORMATION PROCESSING APPARATUS TO DISPLAY PRINT ATTRIBUTE OF MULTIPLE GROUPS ON IDENTICAL DISPLAY AND NON-TRANSITORY COMPUTER READABLE MEDIUM

CROSS-REFERENCE TO RELATED APPLICATIONS

This application is based on and claims priority under 35 USC 119 from Japanese Patent Application No. 2020-044945 filed Mar. 16, 2020.

BACKGROUND

(i) Technical Field

The present disclosure relates to an information processing apparatus and a non-transitory computer readable medium.

(ii) Related Art

In Japanese Unexamined Patent Application Publication No. 2007-328516, the following technique has been proposed: chapters are set to a single file; and print attributes may be set to each of the chapters. In Japanese Unexamined Patent Application Publication No. 2007-328516, a preview screen is displayed. When a user, who refers to the preview screen, wants to change a print attribute, a print-attribute setting screen is displayed separately from the preview screen, and the print attribute is changed on the displayed setting screen.

Other techniques of the related art are described in Japanese Patent No. 4095458 and Japanese Patent No. 3752867.

SUMMARY

Aspects of non-limiting embodiments of the present disclosure relate to a technique which, when print attributes are set to each group having a single page or multiple pages, facilitates a user's check on the print attributes which are set to the groups, compared with the case in which, while multiple groups are displayed on a screen, the print attributes, which are set to the groups, are not displayed on the same screen.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a processor configured to, in a case where a print attribute is set for each of a plurality of groups each having a single page or a plurality of pages, display the plurality of groups and the print attribute on an identical display.

BRIEF DESCRIPTION OF THE DRAWINGS

Exemplary embodiment of the present disclosure will be described in detail based on the following figures, wherein.

DETAILED DESCRIPTION

Desirable exemplary embodiment of the present disclosure will be described below on the basis of the drawings.

An information processing apparatus according to the present exemplary embodiment may be implemented by using a general-purpose hardware configuration such as a personal computer (PC) which has been used. That is, the information processing apparatus includes a central processing unit (CPU), a storage unit, including a read-only memory (ROM), a random-access memory (RAM), and a hard disk drive (HDD), a user interface unit, including an input unit, such as a mouse and a keyboard, and a display device provided as a display unit, and a network interface provided as a communication unit.

File, group, and page, which are handled in the present exemplary embodiment, will be defined. A "file" has one or more pages. A "page" indicates a unit for forming a file. In a file according to the present exemplary embodiment, its pages are partitioned into multiple "groups". When a file has only a single group, the file and the group indicate the same concept. Thus, unless otherwise specified, a file having only a single group is handled as a group, not as a file. For example, when a file is a document file, groups correspond to chapters obtained by partitioning the file into multiple sets of pages.

Figure 1:
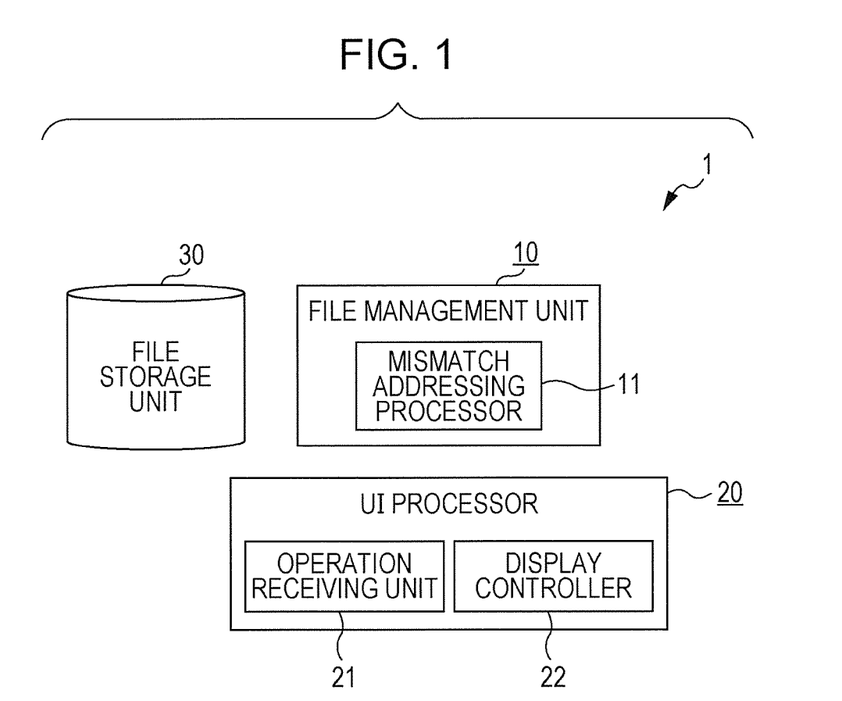
FIG. 1 is a block diagram illustrating the configuration of an information processing apparatus according to an exemplary embodiment of the present disclosure.

FIG. 1 is a block diagram illustrating the configuration of an information processing apparatus 1 according to an exemplary embodiment of the present disclosure. The information processing apparatus 1 according to the present exemplary embodiment includes a file management unit 10, a user interface (UI) processor 20, and a file storage unit 30. Components, which are not used in the description about the present exemplary embodiment, are not illustrated in FIG. 1.

The file storage unit 30 stores files and groups. In the present exemplary embodiment, a group may be handled as a unit of storage. The file management unit 10 performs management, such as registration, change, and deletion of the files and groups stored in the file storage unit 30. The file management unit 10 sets and changes print attributes of the files and groups in accordance with instruction operations performed by a user. The file management unit 10 includes a mismatch addressing processor 11 that performs a mismatch addressing process which eliminates a mismatch between print attributes, for example, when, through a user operation, a print attribute, which is mutually exclusive against another print attribute, is set to a group, as described in detail below.

The user interface processor 20 includes an operation receiving unit 21 and a display controller 22. The operation receiving unit 21 receives user operations using a mouse, a keyboard, and the like. The display controller 22 controls display on a display device in accordance with an instruction from the file management unit 10.

The components 10 and 20 in the information processing apparatus 1 are implemented through collaborative operations between a computer, which forms the information processing apparatus 1, and programs operated by the CPU in the computer. The file storage unit 30 is implemented by using the HDD in the information processing apparatus 1. Alternatively, the file storage unit 30 may be implemented by using an external storage unit over a network.

The programs used in the present exemplary embodiment may be provided, not only by using a communication unit, but also by storing the programs in a computer-readable recording medium, such as a compact disc-read-only memory (CD-ROM) or a Universal Serial Bus (USB) memory. The programs, which are provided through the communication unit or the recording medium, are installed in the computer. The CPU of the computer executes the programs sequentially, thus implementing various processes.

Figure 2:
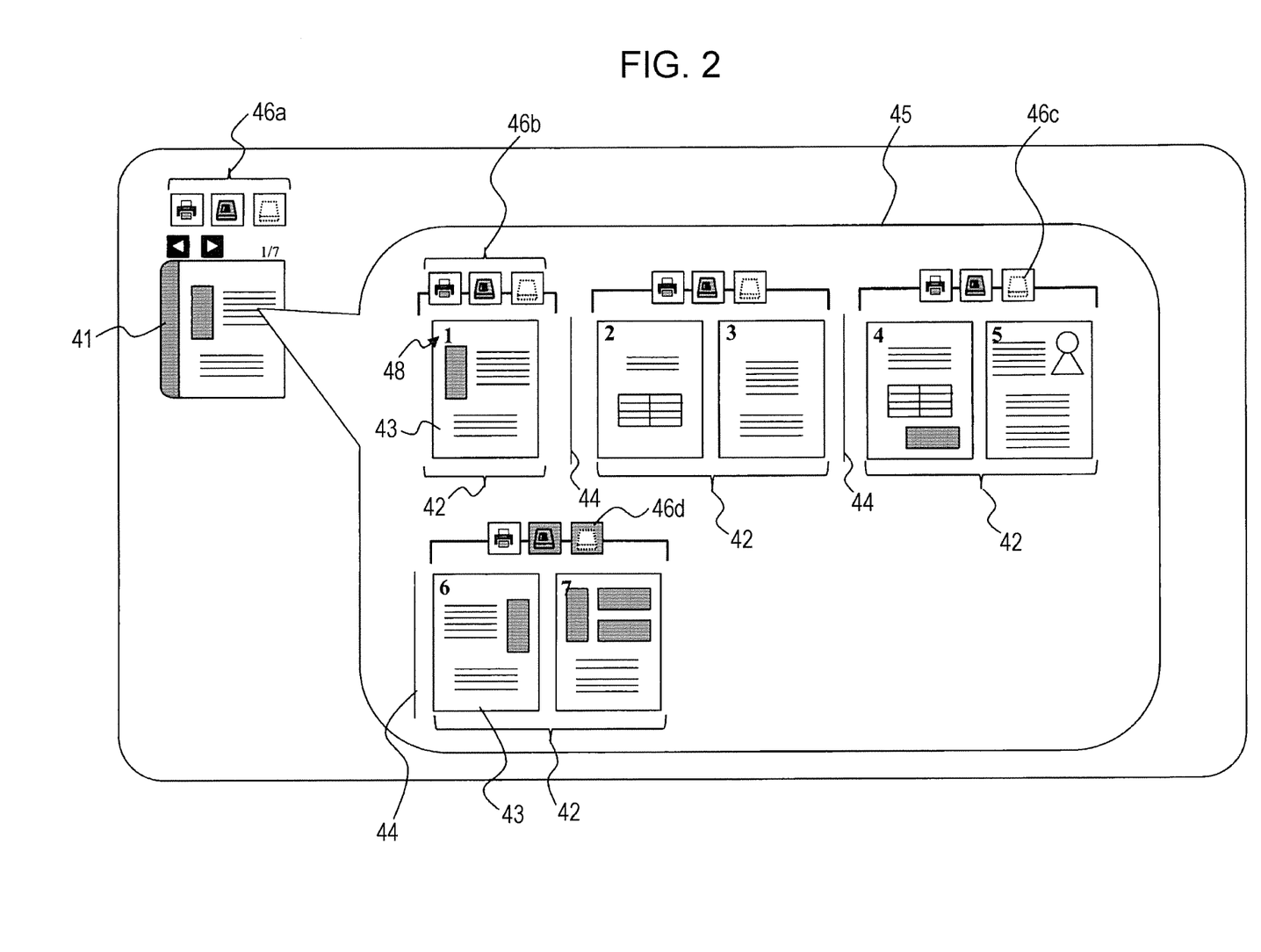
FIG. 2 is a diagram illustrating an exemplary display screen according to the present exemplary embodiment.

FIG. 2 is a diagram illustrating exemplary screen display according to the present exemplary embodiment. Groups 42 are registered in a file 41. Thus, the groups 42, which are included in the file 41, are managed. As a matter of course, a group 42 may be removed from the file 41. For example, a file 41 may be generated for each project. All documents related to the project, such as a planning report, a functional specification, and a manual, may be desirably managed in a file 41 collectively.

In the present exemplary embodiment, the groups 42 are thus stored in the file storage unit 30 as individual groups, or are managed in a file 41 collectively. As a matter of course, a group 42 included in a file 41 may be extracted from the file 41 to be handled as an individual group.

As described above, in the present exemplary embodiment, there is a hierarchical relationship of files 41, the groups 42 included in each file 41, and the pages 43 included in each group 42. However, the hierarchical relationship is not necessarily limited to this.

As illustrated in FIG. 2, files 41, groups 42, and pages 43 are displayed as reduced images, that thumbnails, in a real display. Similarly, print attributes described below are displayed in a screen as icons serving as display components of the print attributes. For simplification of description, unless otherwise specified, a word, such as "thumbnail" or "icon", is skipped in the description below as appropriate, for example, as in "A group 42 is displayed."

Figure 3:
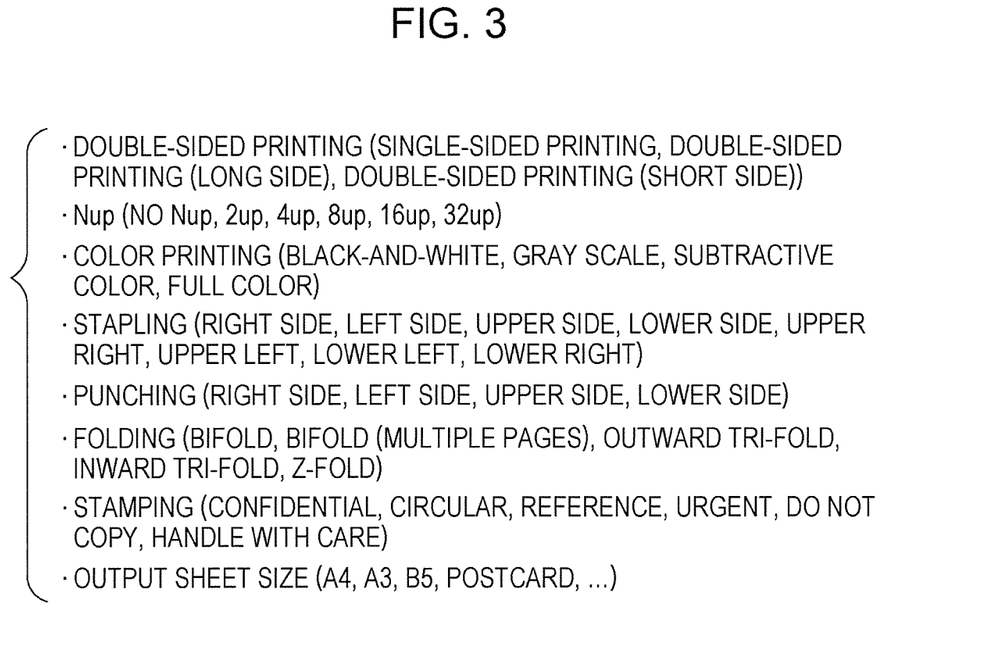
FIG. 3 is a diagram illustrating an example of print attribute items and the attribute values of the attribute items.

In the present exemplary embodiment, print attributes are set for each file 41, and print attributes are set for each group 42. That is, print attributes are set hierarchically. FIG. 3 illustrates an example of print attribute items and the setting values of the items.

Figure 4:
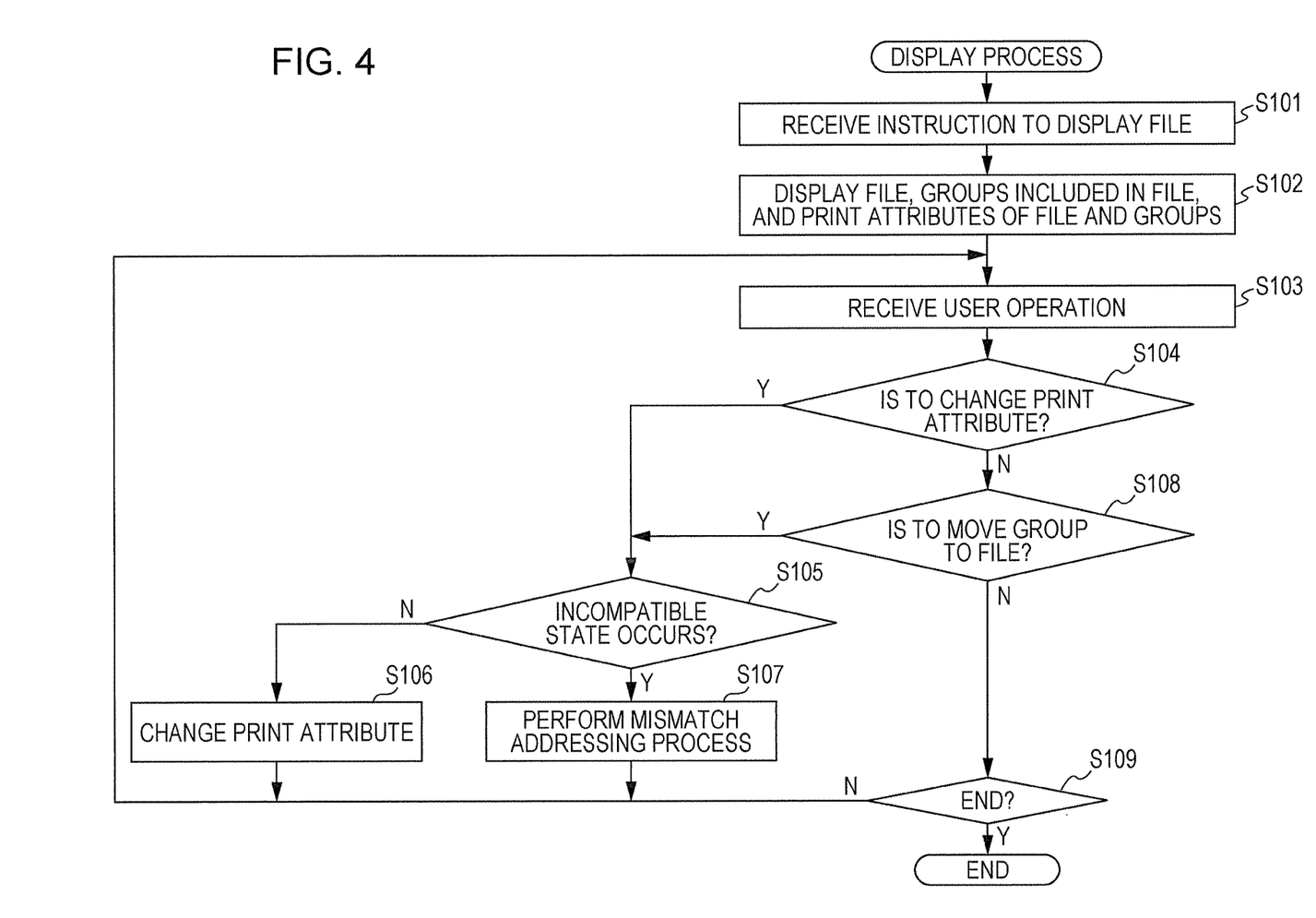
FIG. 4 is a flowchart of a display process according to the present exemplary embodiment.

A characteristic display process in the present exemplary embodiment will be described by using the flowchart in FIG. 4.

A user selects a file 41, which is to be displayed, by using a given file management application. When the operation receiving unit 21 receives the user operation, that is, the instruction to display the file 41 (step 101), the file management unit 10 retrieves information about the specified file 41 from the file storage unit 30, and causes the display controller 22 to display the retrieved information on a screen. When the user performs a given first operation such as a double click on the displayed file 41, the file management unit 10 retrieves information about the groups 42, which are included in the file 41, from the file storage unit 30, and causes the display controller 22 to display the retrieved information on the screen. In accordance with an instruction from the file management unit 10, as illustrated in FIG. 2, the display controller 22 displays, on the screen, the file 41, the groups 42 included in the file 41, and the print attributes which are set for the file 41 and the groups 42 (step 102). The configuration of the display screen displayed through display control exerted by the display controller 22 will be described.

As described above, a file 41 is displayed in accordance with a selection operation performed by a user. When the file 41 is double-clicked, the groups 42 included in the file 41 are displayed in a given area, that is, in a balloon 45 originating from the file 41 in FIG. 2. FIG. 2 illustrates a group 42 having one page and three groups 42 having two pages. The groups 42 are separated from each other by using separator lines 44.

Print attributes 46a for the file 41 are displayed in association with the file 41. Similarly, print attributes 46b for a group 42 are displayed in association with the corresponding group 42. When the print attributes 46a are not necessarily differentiated from the print attributes 46b, the print attributes 46a and the print attributes 46b are collectively called "print attributes 46". As illustrated by using print attributes 46c and 46d, a print attribute may indicate the ON/OFF state by changing the background color of the icon, and may be differentiated by changing the icon form. The displayed print attributes 46 and the number of print attributes 46 are not limited to the display example in FIG. 2. The types, which are to be displayed, of the print attributes 46a and the print attributes 46b are desirably the same for easy comparison, but are not necessarily the same. In the present exemplary embodiment, a print attribute 46 is illustrated as an icon. The display form is not limited to this, and another display component such as characters may be displayed.

A group 42 is displayed with its pages 43 being deployed. To each page 43 included in a file 41, a print page number 48 is assigned. FIG. 2 illustrates an example in which the print page number 48 is displayed near the left corner of each page 43. The print page numbers 48 are serial numbers of the pages in the file 41, and correspond to the order of printing which is used when all the pages 43 included in the file 41 are printed.

In the present exemplary embodiment, as described by using FIG. 2, the print attributes 46a, which are set for a file 41, the groups 42 included in the file 41, the print attributes 46b, which are set for each group 42, and the pages 43 included in each group 42 are displayed on the same screen.

For example, the following operation does not correspond to display on the same screen in the present exemplary embodiment: a user performs a display operation such as a right click on the screen (that is, a display device) on which a group 42 is displayed; and property information such as print attributes is displayed on a different window on the display device. This indicates display of the property information on a different window screen, and merely indicates display on a single physical screen such as a display device. The "same screen" in the present exemplary embodiment means that, as illustrated in FIG. 2, print attributes 46 are displayed on the same screen as the screen on which the file 41 and the groups 42 are displayed, that is, on the same window screen.

When a user performs some operation on the display screen in FIG. 2, the operation receiving unit 21 receives the user operation (step 103).

If the user operation is an operation of changing the setting of a print attribute (Y in step 104), the file management unit 10 checks if an incompatible state occurs between the print attribute settings of the file 41 and the print attribute settings of each group 42. The term "incompatible" indicates, for example, the case in which, in the case where the single-side printing attribute is set for the file 41, the double-sided printing attribute, which is not capable of being set at the same time and which is mutually exclusive against the single-side printing attribute, is set for a group 42 included in the file 41. In the present exemplary embodiment, the term "incompatible" is used for the mutually exclusive settings. When a user performs an operation which may produce an incompatible state, a mismatch addressing process is performed to eliminate the mismatch between print attributes.

There are two types of print attributes: a print attribute which is generally called a default or an initial setting and which is set implicitly (hereinafter referred to as a "default setting"); a print attribute which is set explicitly by a user selecting a desired attribute value from settable attribute values. A default setting is a setting on which a user has not performed a setting operation explicitly. Thus, even though an initial value has been set, this state may be regarded as a state in which a user has not set the print attribute.

A process performed when an incompatible state may occur will be described by taking, as an example, the single-side printing attribute and the double-sided printing attribute which are mutually exclusive print attributes and which are alternative to and exclusive against each other. Strictly speaking, there is a printer which has both of the following functions: a function of performing double-sided printing by using the long side of a sheet as the reference; and a function of performing double-sided printing by using the short side of a sheet as the reference. The example described herein assumes a printer which does not have the double-sided printing function of the two types.

Between the single-side printing attribute and the double-sided printing attribute, the single-side printing attribute is typically a default setting. Therefore, in the description below, unless otherwise specified, the state in which the single-side printing attribute is set indicates a state in which the default setting has been set as it is and has not been changed explicitly. There are the following four cases of setting a print attribute:

(1) The case in which the single-side printing attribute is set to both a file 41 and its group 42;

(2) The case in which the single-side printing attribute is set to a file 41 and the double-sided printing attribute is set to its group 42;

(3) The case in which the double-sided printing attribute is set to a file 41 and the single-side printing attribute is set to its group 42;

(4) The case in which the double-sided printing attribute is set to both a file 41 and its group 42. When a user is to change a print attribute of a file 41, the user operates a print attribute 46*a*. When a user is to change a print attribute of a group 42, the user operates a print attribute 46*b*. Since a file 41 typically includes multiple groups 42, it is necessary to assume that the single-side printing attribute is set to some of the groups 42 and the double-sided printing attribute is set to the other groups 42.

The case in which a print attribute 46*b* of a group 42 is changed will be described.

(Group 1): In the case of changing a setting from state (1) described above, the setting of the group 42 is changed to the double-sided printing attribute, resulting in presence of mutually exclusive settings. In contrast, the setting of the file 41 is the default setting which may be regarded as the state in which the print attribute has not been set. Therefore, the file management unit 10 determines that an incompatible state has not occurred in this example (N in step 105), and regards the change to the double-sided printing attribute as being valid (step 106). In this case, other groups 42, whose print attributes have not been changed, still have the single-side printing attribute setting.

(Group 2): In the case of changing a setting from state (2) described above, the setting of the group 42 is changed to the single-side printing attribute, and presence of the mutually exclusive settings is eliminated. Therefore, the file management unit 10 determines that an incompatible state does not occur in this example (N in step 105), and regards the change to the single-side printing attribute as being valid (step 106). In this case, for other groups 42, whose print attributes have not been subjected to the change operation and which have the double-sided printing attribute setting, their explicit settings are used preferentially.

(Group 3): In the case of changing a setting from state (3) described above, the setting of the group 42 is changed to the double-sided printing attribute, and presence of the mutually exclusive settings is eliminated. Therefore, the file management unit 10 determines that an incompatible state does not occur in this example (N in step 105), and regards the change to the double-sided printing attribute as being valid (step 106). In this case, other groups 42, whose print attributes have not been changed, preferentially use the double-sided printing attribute setting which has been set explicitly for the file 41.

(Group 4): In the case of changing a setting from state (4) described above, the setting of the group 42 is changed to the single-side printing attribute, resulting in presence of mutually exclusive settings. In addition, the change of a setting to the single-side printing attribute also indicates an explicit change of a setting performed by a user. In contrast, the setting of the file 41 has been set to the double-sided printing attribute explicitly. In this case, the file management unit 10 determines that an incompatible state occurs (Y in step 105), and the mismatch addressing processor 11 performs some mismatch addressing process (step 107).

For example, since the print attribute setting of the group 42 has been changed after a change of the setting of the file 41, the later change of the setting of the group 42 to the single-sided printing attribute may be regarded as being valid. In this case, display of a print attribute 46*b* of the group 42 is switched to the display of the single-sided printing attribute. Alternatively, a setting of the file 41, which is an upper setting, may be used preferentially to the corresponding setting of each group 42 which is a lower setting. In this case, a user operation of changing a setting of a group 42 is rejected. The mismatch addressing processor 11 may display a message that an incompatible state occurs, for notification to a user. For example, the mismatch addressing processor 11 may ask the user about which setting is to be used preferentially, or whether or not the change of a setting of the group 42 is to be made invalid.

Cases in which a print attribute 46a of a file 41 is set will be described. As described above, it is necessary to assume that the single-side printing attribute is set to some of the groups 42 of the file 41, and the double-sided printing attribute is set to the others.

(File 1): When a user operation is performed to change the setting of the file 41 from the single-side printing attribute to the double-sided printing attribute, presence of the mutually exclusive settings for the groups 42 having the double-sided printing attribute setting is eliminated. In contrast, it may be assumed that, the default setting has been set for the groups 42 having the single-side printing attribute setting. Therefore, the file management unit 10 determines that an incompatible state does not occur for the groups 42 having the single-side printing attribute setting (N in step 105), and regards the change to the double-sided printing attribute as being valid (step 106). In this case, the print attribute 46a of the file 41 is switched to display of the double-sided printing attribute. The double-sided printing attribute is applied also to the print attributes of the groups 42 having the single-side printing attribute setting. Accordingly, the print attributes 46b of the groups 42 may be also switched automatically to display of the double-sided printing attribute.

(File 2): When a user operation is performed to change the setting of the file 41 from the double-sided printing attribute to the single-side printing attribute, presence of the mutually exclusive settings for the groups 42 having the single-side printing attribute setting is eliminated. In contrast, mutually exclusive settings occur for the groups 42 having the double-sided printing attribute setting. In this case, the setting of the file 41 is explicitly changed to the single-side printing attribute by the user, and the settings of the groups 42 are explicitly changed to the double-sided printing attribute by the user. Therefore, the file management unit 10 determines that an incompatible state occurs (Y in step 105), and the mismatch addressing processor 11 performs some mismatch addressing process (step 107).

For example, since the print attribute setting of the file 41 is changed after changes of the settings of the groups 42, the later change of the setting of the file 41 to the single-side printing attribute may be regarded as being valid. In this case, the single-side printing attribute is applied also to the groups 42 having the double-sided printing attribute setting. At that time, the print attributes 46b may be switched automatically to the single-side printing attribute. Alternatively, the settings of the individual groups 42 may be used preferentially. In this case, the user operation of changing a setting of the file 41 is rejected. The mismatch addressing processor 11 may display a message that an incompatible state occurs, for notification to a user. The mismatch addressing processor 11 may ask the user about which setting is to be used preferentially or whether or not the change of a setting of the file 41 is to be made invalid.

Figure 5:
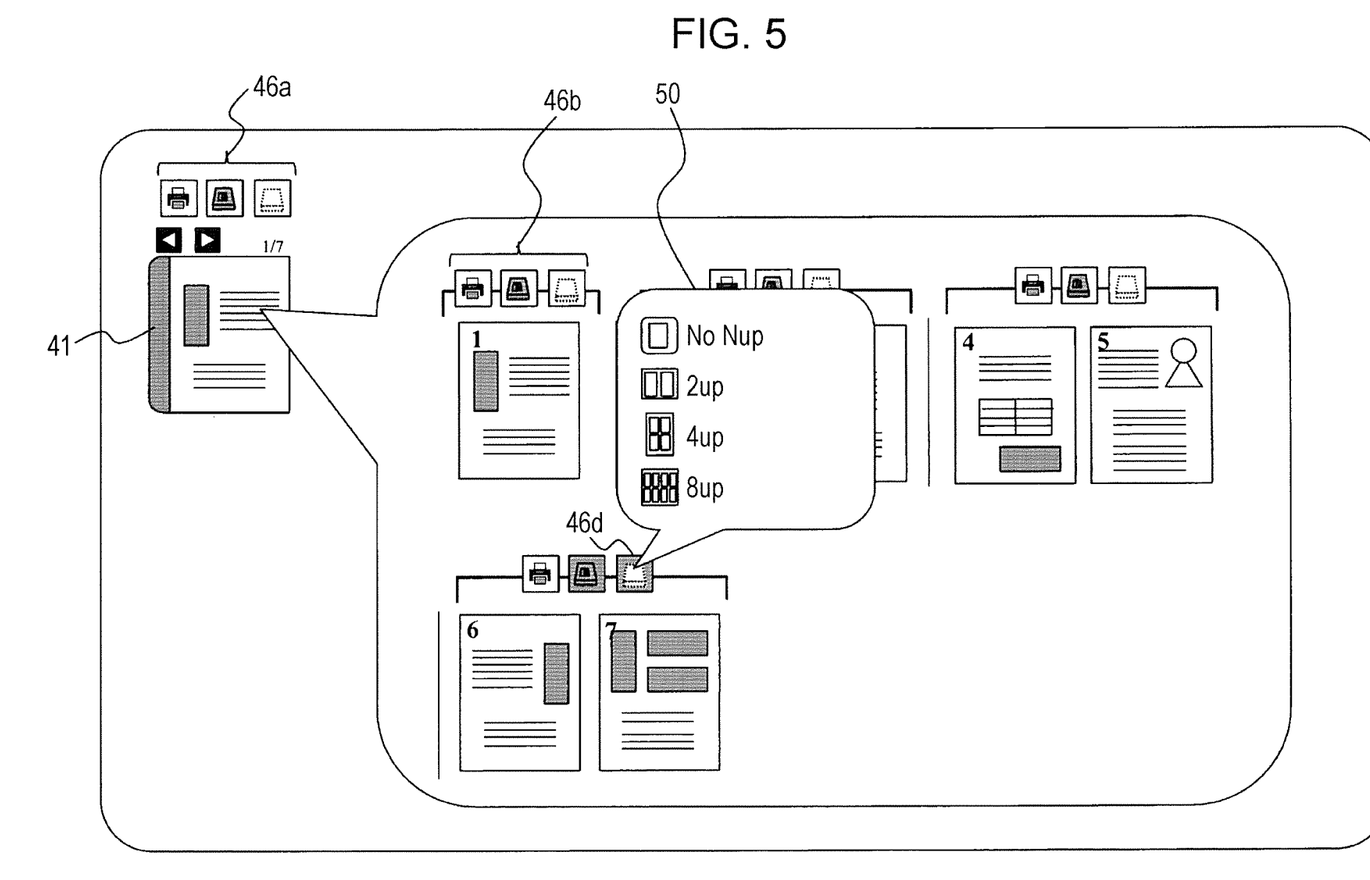
FIG. 5 is a diagram illustrating an exemplary screen displayed when a print attribute icon is selected in FIG. 2.

The description above is made by taking, as an example, the single-side printing attribute and the double-side printing attribute which have an exclusive relationship such as ON/OFF. Some of the print attributes are not alternative. Such examples include a print attribute for selecting the number of pages that are to be printed in a single sheet, and a print attribute for selecting a sheet size. FIG. 5 illustrates an exemplary case in which a print attribute is set through selection from settable attribute values.

If an user operation of changing a print attribute setting is received (Y in step 104), when the print attribute 46d selected by the user is a print attribute which may be set from multiple attribute values, the display controller 22 displays a list of the selectable attribute values of the print attribute 46d, which has been selected as illustrated in FIG. 5, in a given area, that is, in a balloon 50 originating from the print attribute 46b in FIG. 5. The file management unit 10 changes the print attribute setting to the attribute value selected through a click operation from the balloon 50 (step 106).

As described above, according to the present exemplary embodiment, a user operates print attributes 46 displayed on a screen, allowing print attributes, which are set for a file 41 and its groups 42, to be changed without switching to a screen on which the groups 42 are displayed.

Figure 6:
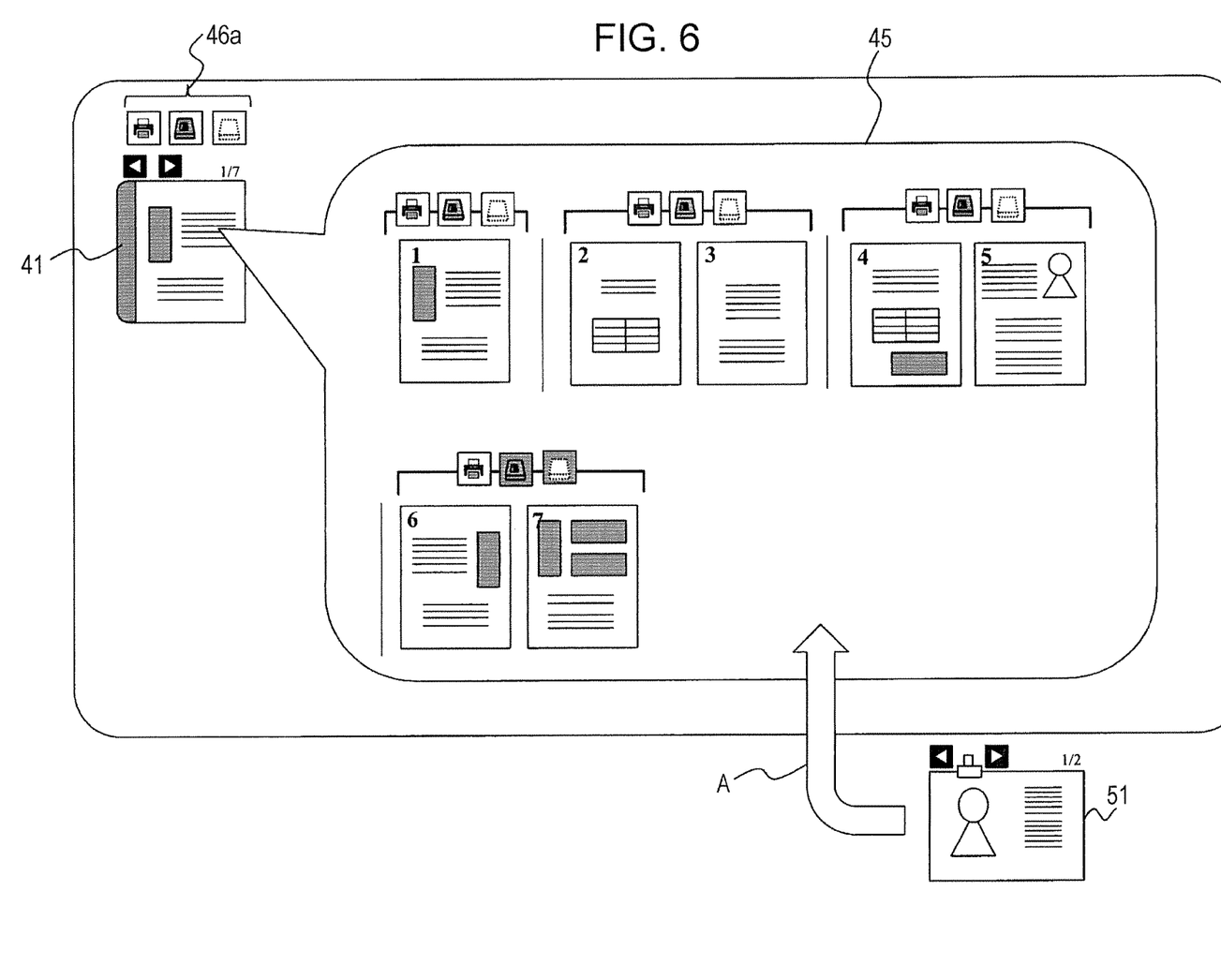
FIG. 6 is a diagram illustrating an operation of adding a group to a file, in the present exemplary embodiment.
Figure 7:
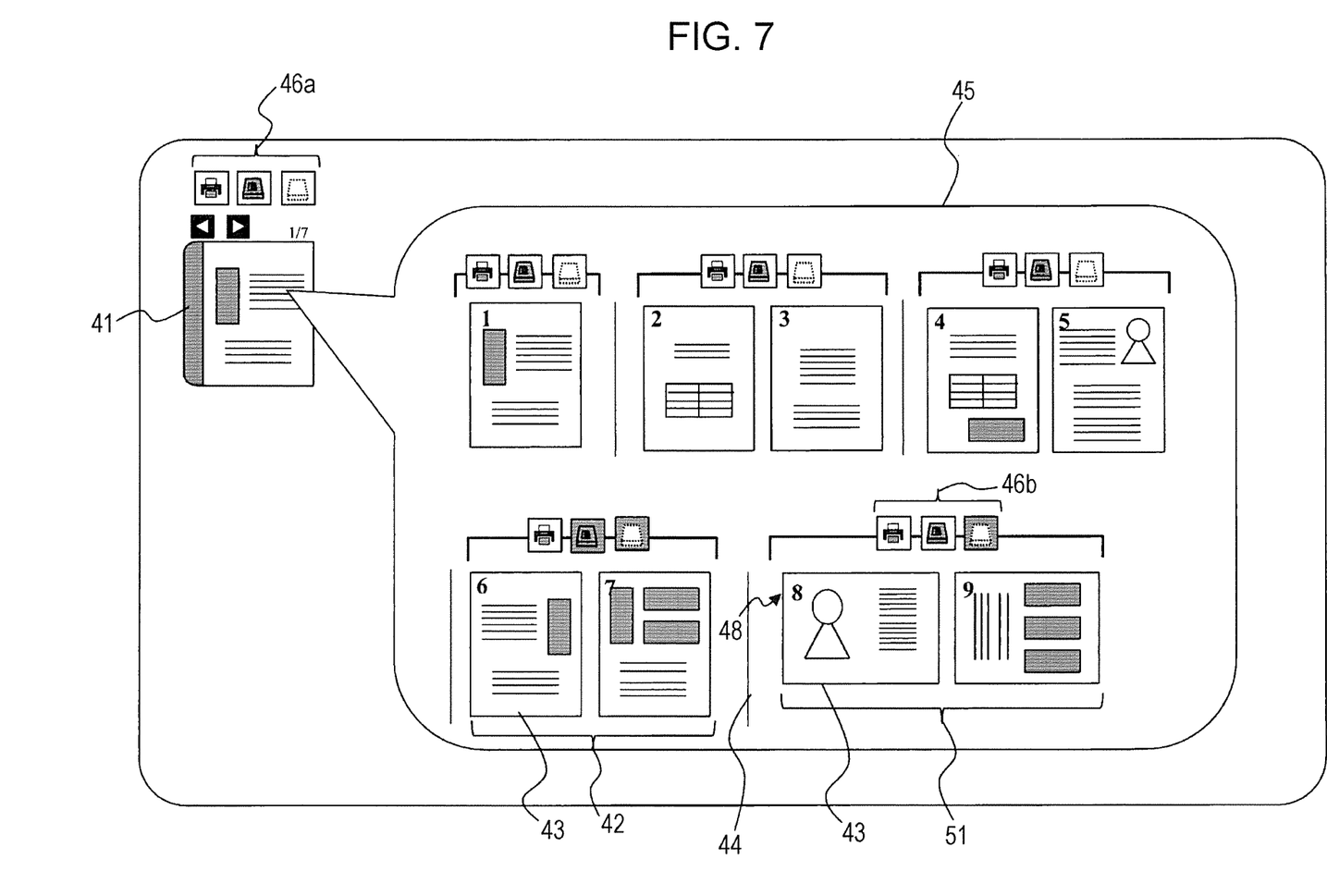
FIG. 7 is a diagram illustrating an exemplary screen displayed when a group is added to a file, in the present exemplary embodiment.

As described above, a file 4, which has multiple groups 42, is generated. After generation of the file 41, a group 42 may be additionally registered to the file 41. Therefore, assume the case in which a received user operation is not an operation of changing a print attribute setting (N in step 104), and, as illustrated by using arrow A in FIG. 6, is an operation (for example, dragging and dropping) of moving an icon (hereinafter simply referred to as a "group") 51, indicating a group, to the balloon 45 originating from the file 41 (Y in step 108). If this case does not cause an incompatible state for the print attributes (N in step 105), the file management unit 10 instructs the display controller 22 to deploy the pages 43 in the group 51 for display, like the other groups 42 as illustrated in FIG. 7. In this case, since an incompatible state does not occur for the print attributes of the group 51, any change is not necessarily made. However, in consideration of the case of the default setting, settings may be changed when necessary (step 106). Thus, the group 51 is additionally registered to the file 41. A separator line 44 between the group 51 and a different group 42 indicates that the group 51 and the group 42 are included in different files. A print page number 48 is added to each page 43 of the group 51. The display controller 22 displays the print attributes 46b, which are characteristic in the present exemplary embodiment, in association with the group 51.

As described above, change of print attribute settings of a file 41 and its group 42 may cause occurrence of incompatible states. When the group 51 is added, the problem of an incompatible state between print attributes may arise similarly. Therefore, in the present exemplary embodiment, the following measures are taken.

The file management unit 10 sets, in advance, the method for addressing occurrence of an incompatible state between print attributes of the file 41 and the added group 51, in accordance with a user instruction.

Figure 8:
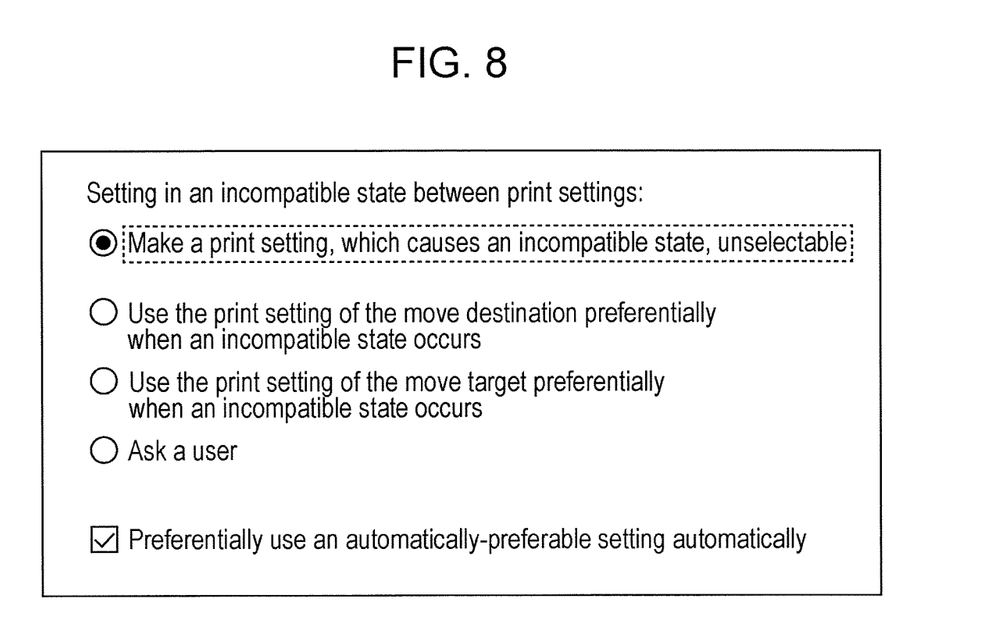
FIG. 8 is diagram illustrating exemplary screen display for setting, in advance, a method for addressing an incompatible state, in the present exemplary embodiment.

FIG. 8 is a diagram illustrating exemplary screen display for setting, in advance, a method for addressing an incompatible state. In FIG. 8, assume the case in which a user selects "Make a print setting, which causes an incompatible state, unselectable." In this case, when a print attribute of the file 41 is incompatible with a print attribute of the group 51, addition of the group 51 to the file 41 is rejected. For example, a user operates a mouse to perform a drag-and-drop operation for moving the group 51 into the balloon 45. At that time, the mouse cursor, which is moved into the balloon 45, is switched from the normal display component of arrow, for example, to a display component indicating that no dropping is allowed. Thus, the user is notified that the group 51 is not allowed to be added to the file 41.

In the case where a user selects "Use the print setting of the move destination preferentially when an incompatible state occurs," addition of the group 51 to the file 41 is allowed, but the print attribute of the file 41, which is the destination, is preferentially used. That is, the print attribute of the file 41 is newly set as the print attribute of the group 51.

In the case where a user selects "Use the print setting of the move target preferentially when an incompatible state occurs," addition of the group 51 to the file 41 is allowed, but the print attribute of the group 51, which is the target of the move, is preferentially used. The print attribute of the group 51 is not changed by using the print attribute of the file 41, and the print attribute, which has been already set to the group 51, is still valid.

Figure 9:
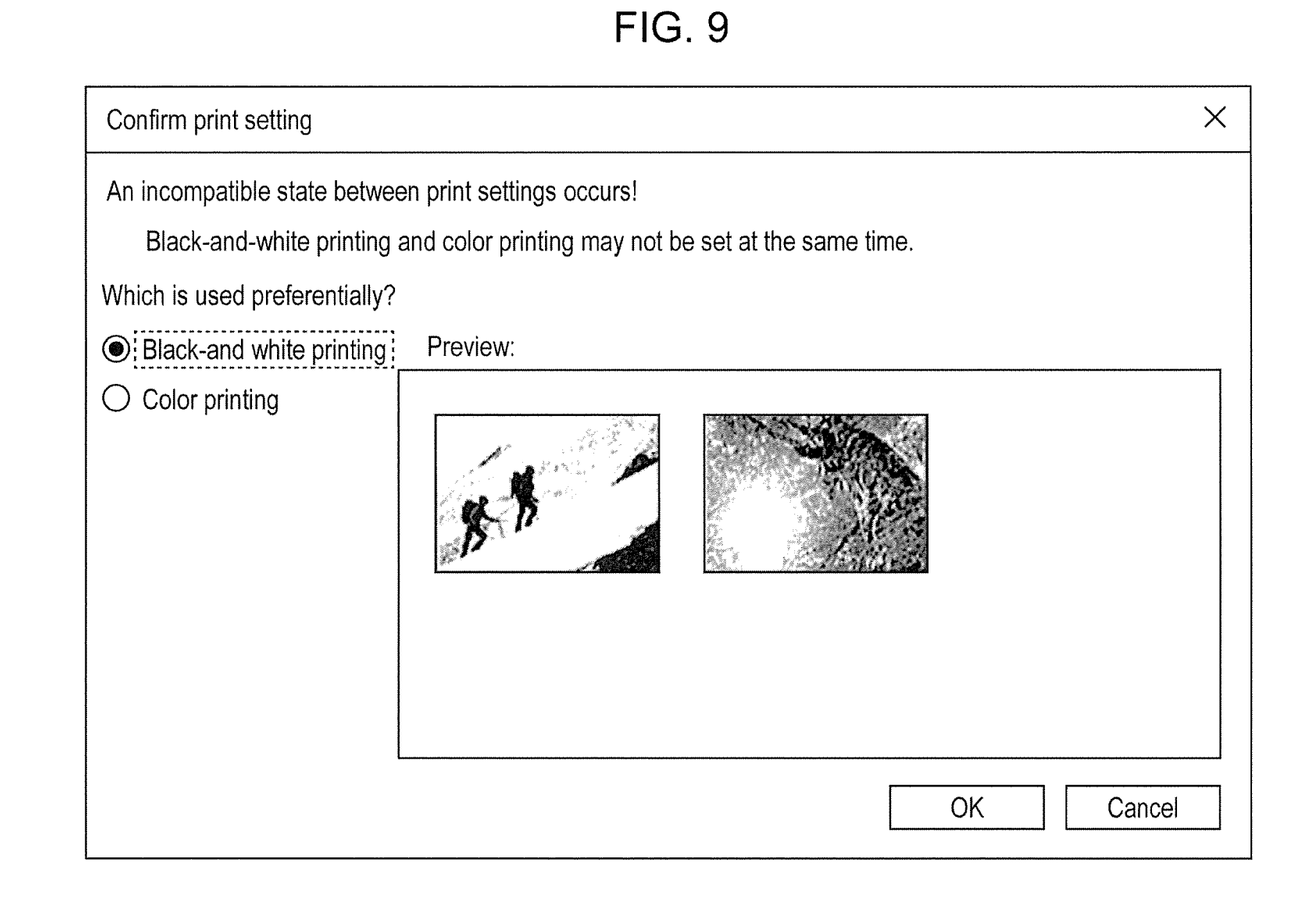
FIG. 9 is a diagram illustrating an exemplary inquiry screen displayed when an incompatible state occurs, in the present exemplary embodiment.

In the case where a user selects "Ask a user," the user is asked about which is to be used preferentially, the print attribute of the file 41 or that of the group 51, every time. FIG. 9 illustrates an exemplary inquiry screen to a user.

FIG. 9 illustrates an example of black-and-white printing and color printing as print attributes which cause an incompatible state. A user selects one of the print attributes on the screen.

When a user checks a check box, "Preferentially use an automatically-preferable setting automatically," the file management unit 10 by itself determines which is to be used preferentially, according to a given algorithm. However, when a radio button, "Make a print setting, which causes an incompatible state, unselectable," is selected, the check box is displayed so as to be grayed out and not to be settable. When a radio button other than this is selected, change of a setting is allowed.

Figure 10:
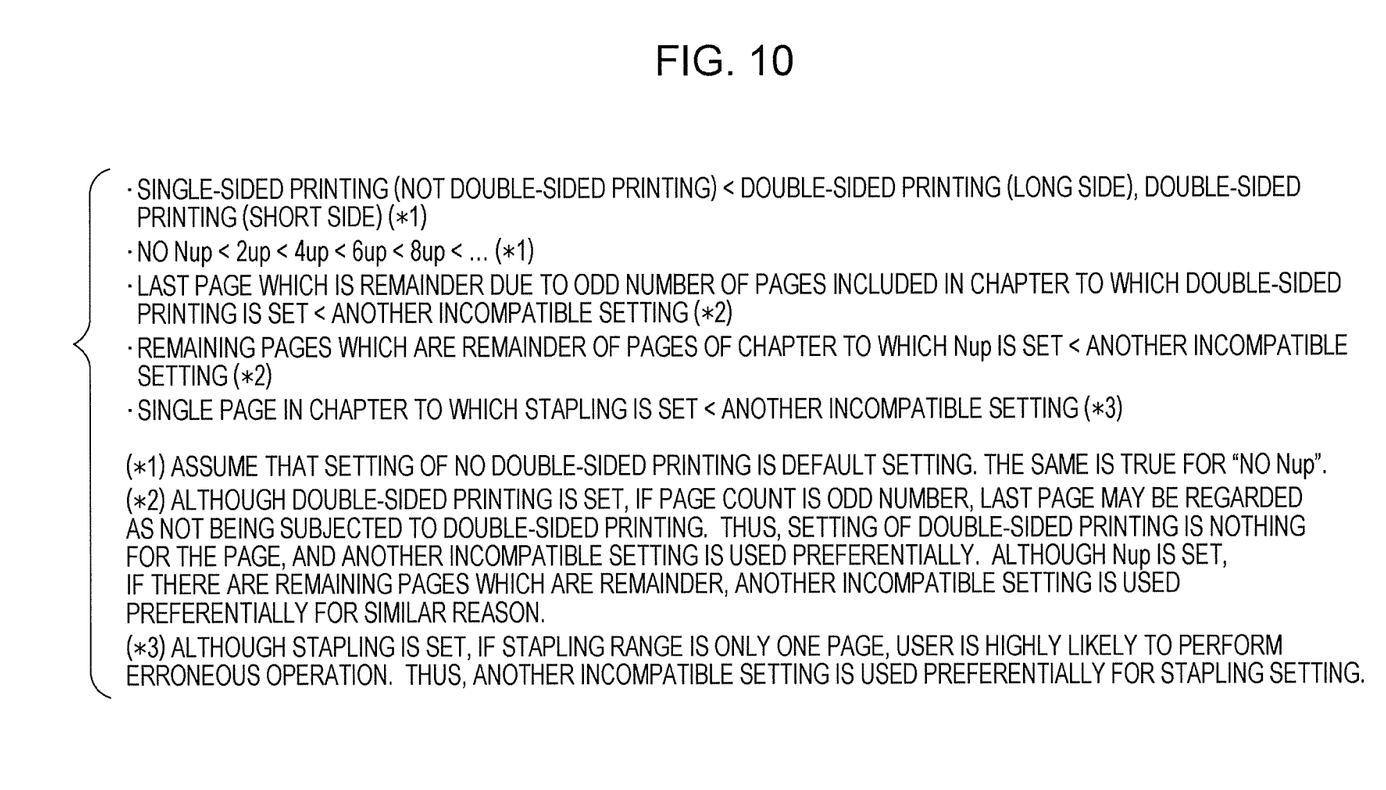
FIG. 10 is a diagram illustrating exemplary setting of print attributes with priorities, in the present exemplary embodiment.

Automatically-preferable settings are specifically illustrated in FIG. 10. FIG. 10 illustrates the degrees of priority by using inequality signs (<). That is, when a print attribute on the left side is incompatible with a print attribute on the right side, the print attribute on the right side is preferentially used. In the mismatch addressing process, when the orders of priority are thus predetermined for possible print attribute settings, a print attribute setting of any page of a file 41 or a group 51 is changed according to the orders of priority, causing a mismatch between print attributes to be eliminated.

If an incompatible state occurs between a print attribute of the file 41 and a print attribute of the added group 51 in accordance with a user instruction (Y in step 105), the file management unit 10 causes the mismatch addressing processor 11 to perform the mismatch addressing process according to the settings described above. The mismatch addressing processor 11 changes a print attribute as appropriate so as to eliminate the mismatching state between the print attributes (step 107).

Similarly, for the incompatible states, which are described above, between the print attributes of a file 41 and the print attributes of its group 42, the method for addressing the incompatible states may be set in advance.

Figure 11:
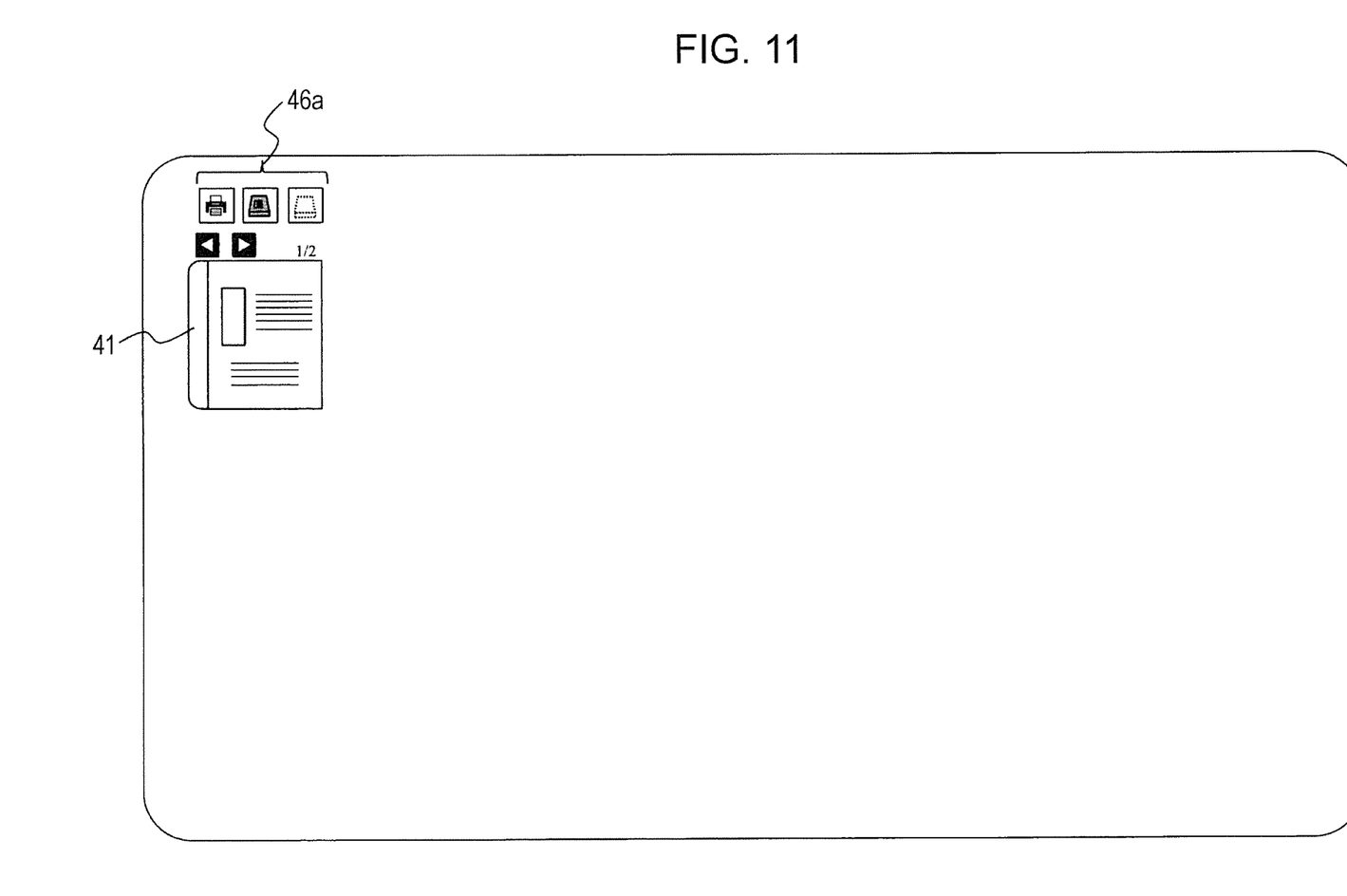
FIG. 11 is a diagram illustrating an exemplary screen displayed when a file has only a single group, in the present exemplary embodiment.

A file 41 typically has multiple groups 42. However, a file 41 may have only a single group. In this case, the print attribute settings of the file 41 are regarded as being the same as those of the group 42. Thus, it is not necessary to display the print attributes in association with both the file 41 and the single group and notify a user of the difference between the print attribute settings. In this case, it is efficient to display only the print attributes of the file 41 or the single group. The description is made above under the assumption that, when a file has only a single group, the file is handled as a group. To easily contrast the case (FIG. 2) in which a file 41 has multiple groups 42 with the case in which a file 41 has only a single group, FIG. 11 illustrates an example in which, for the sake of description, only the file 41 is displayed in such a manner that the group is not displayed and its pages are not deployed, and in which only the print attributes 46a of the file 41 are displayed.

Figure 12:
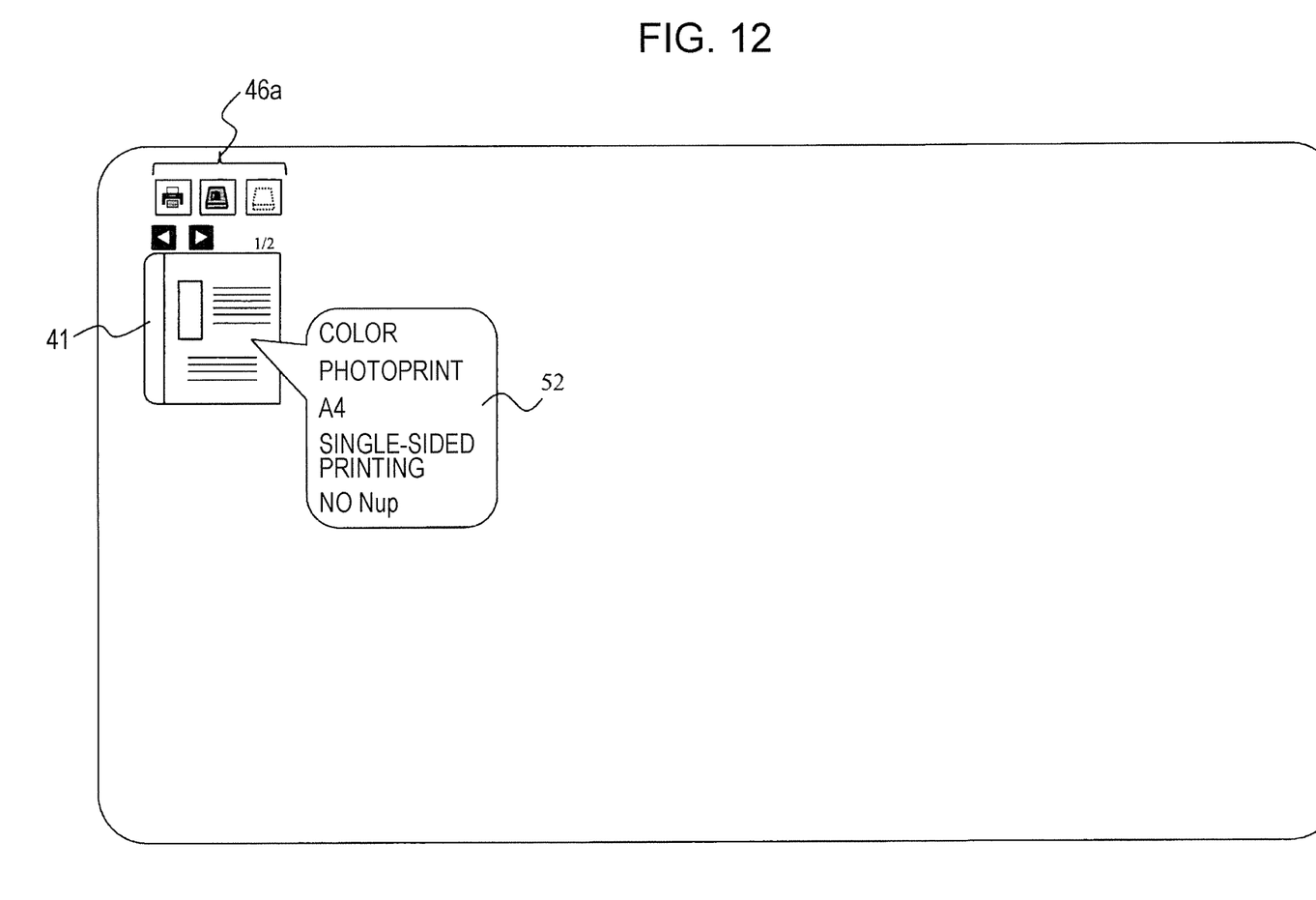
FIG. 12 is a diagram illustrating an exemplary screen displayed when a file is selected in FIG. 11.

As described above, when a user performs a given first operation such as a double click on a displayed file 41 having multiple groups 42, as illustrated in FIG. 2, the display controller 22 displays, on a screen, the groups 42, which are included in the file 41, and the print attributes, which are set for each of the groups 42, in accordance with an instruction from the file management unit 10 (step 102). In contrast, when a file 41 has only a single group, the print attributes, which are set for the file, are regarded as being the same as those of the single group. Thus, when the given first operation such as a double click is performed on the displayed file 41, it is not necessary to display the print attributes which are set for the group. Therefore, when a user performs the given first operation such as a double click on a file having only a single group, as illustrated in FIG. 12, the display controller 22 may display the details of the print attributes, which are set for the file 41, in accordance with an instruction from the file management unit 10. Thus, even when a user performs the same first operation, the file management unit 10 performs a different process depending on the configuration of the group(s) 42 included in the file 41.

The display controller 22 may display the print attributes, not as icons, in a given area as illustrated in FIG. 12, that is, by using characters in a balloon 52 originating from the file 41. The print attributes displayed in the balloon 52 are not limited to the print attributes 46a, that is, the print attributes displayed as icons. In addition to these print attributes, print attributes which are not displayed as icons may be displayed.

If a user performs a given operation of ending the display, not the first operation (Y in step 109), the process ends. If the user performs another operation (N in step 109), the process proceeds to step 103 to receive a new operation from the user.

In the present exemplary embodiment, as described above, when the groups 42 included in a file 41, and the pages 43 included in the groups 42 are displayed on a screen, the print attributes which are set for the file 41 and the print attributes which are set for the groups 42 are displayed on the same screen. Further, a print attribute setting may be changed so that an operation on a print attribute 46 does not cause an incompatible state.

In the embodiment above, the term "processor" refers to hardware in a broad sense. Examples of the processor includes general processors (e.g., CPU: Central Processing Unit), dedicated processors (e.g., GPU: Graphics Processing Unit, ASIC: Application Specific Integrated Circuit, FPGA: Field Programmable Gate Array, and programmable logic device).

In the embodiment above, the term "processor" is broad enough to encompass one processor or plural processors in collaboration which are located physically apart from each other but may work cooperatively. The order of operations of the processor is not limited to one described in the embodiment above, and may be changed.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
a processor configured to,
in a case where a print attribute is set for each of a plurality of groups included in a file, each group having a single page or a plurality of pages, display the plurality of groups and the print attribute on an identical display,
change, in accordance with a user operation on a display component, the setting of the print attribute associated with one of the plurality of groups,
perform a mismatch addressing process when determined the change in the setting of the print attribute associated with one of the plurality of groups contradict with a print attribute of the file.

2. The information processing apparatus according to claim 1,
wherein the processor is configured to
illustrate the print attribute associated with the one of the plurality of groups as the display component.

3. The information processing apparatus according to claim 1,
wherein the processor is configured to display, on the identical screen, a group configuration of the file and the print attribute, the file being formed of the plurality of groups, the print attribute being set for each of the plurality of groups.

4. The information processing apparatus according to claim 3,
wherein the processor is configured to
set the print attribute for the file, and
perform the mismatch addressing process when the print attribute of the file or the print attribute of at least one of the groups included in the file is changed and when the print attribute which is set for the file is different from the print attribute of the at least one of the groups after the changing, the mismatch addressing process being a process of eliminating a mismatch between the print attribute of the file and the print attribute of the at least one of the groups.

5. The information processing apparatus according to claim 4,
wherein the processor is configured to
set the print attribute for the file, and
perform the mismatch addressing process when an operation of adding a new group to the file is performed and when the print attribute which is set for the file is different from the print attribute which is set for the new group, the mismatch addressing process being a process of eliminating a mismatch between the print attribute of the file and the print attribute of the new group.

6. The information processing apparatus according to claim 5,
wherein, in the mismatch addressing process, addition of the new group to the file is rejected.

7. The information processing apparatus according to claim 5,
wherein, in the mismatch addressing process, the print attribute which is set for the new group is set newly as the print attribute of the file.

8. The information processing apparatus according to claim 5,
wherein, in the mismatch addressing process, the print attribute which is set for the file is set newly as the print attribute of the new group.

9. The information processing apparatus according to claim 5,
wherein, in the mismatch addressing process, a user is asked about how to eliminate the mismatch between the print attribute which is set for the file and the print attribute which is set for the new group.

10. The information processing apparatus according to claim 5,
wherein, in the mismatch addressing process, when order of priority of settable print attributes is predetermined, the print attribute of the file or the new group is changed according to the order of priority.

11. The information processing apparatus according to claim 5,
wherein, in the mismatch addressing process, when one of the print attributes which are set to the file and the new group is an initial setting and another of the print attributes is not an initial setting, the print attribute which is not the initial setting is set as a new print attribute for the print attribute which is the initial setting.

12. The information processing apparatus according to claim 4,
wherein the processor is configured to,
when a user performs a first operation on the file, display, on the identical screen, a list of pages of a single group in the file, and the print attribute which is set for the single group, and,
when a user performs the first operation on the single group, perform display different from the display performed when the user performs the first operation on the file.

13. The information processing apparatus according to claim 12,
wherein the processor is configured to,
when a user performs the first operation on the single group, display a detail of the print attribute which is set for the single group.

14. A non-transitory computer readable medium storing a program causing a computer to execute a process comprising:
in a case where a print attribute is set for each of a plurality of groups each having a single page or a plurality of pages, displaying the plurality of groups and the print attribute on an identical display,
changing, in accordance with a user operation on a display component, the setting of the print attribute associated with one of the plurality of groups,
performing a mismatch addressing process when determined the change in the setting of the print attribute associated with one of the plurality of groups contradict with a print attribute of the file.

15. An information processing apparatus comprising:
means for, in a case where a print attribute is set for each of a plurality of groups each having a single page or a plurality of pages, displaying the plurality of groups and the print attribute on an identical display,
means for changing, in accordance with a user operation on a display component, the setting of the print attribute associated with one of the plurality of groups,
means for performing a mismatch addressing process when determined the change in the setting of the print attribute associated with one of the plurality of groups contradict with a print attribute of the file.

16. The information processing apparatus according to claim 1,
   wherein the setting of the print attribute comprises displaying a list of selectable attribute values of the print attribute originated from the print attribute and changing the setting of the print attribute to the attribute values.

* * * * *